US007955460B2

(12) United States Patent
Bennett, III et al.

(10) Patent No.: US 7,955,460 B2
(45) Date of Patent: Jun. 7, 2011

(54) MOVABLE BARRIERS HAVING TRANSVERSE STIFFENERS AND METHODS OF MAKING THE SAME

(75) Inventors: Thomas B. Bennett, III, Wooster, OH (US); Willis J. Mullet, Gulf Breeze, FL (US); Dewayne J. Davidson, Pace, FL (US); Michael D. Kridel, Wooster, OH (US)

(73) Assignee: Overhead Door Corporation, Lewisville, TX (US)

( * ) Notice: Subject to any disclaimer, the term of this patent is extended or adjusted under 35 U.S.C. 154(b) by 490 days.

(21) Appl. No.: 12/151,034

(22) Filed: May 2, 2008

(65) Prior Publication Data

US 2009/0272069 A1 Nov. 5, 2009

(51) Int. Cl.
*B32B 3/00* (2006.01)

(52) U.S. Cl. .......................... 156/78; 160/405; 264/46.3

(58) Field of Classification Search .................. 160/201, 160/229.1, 232, 236, 405; 156/78, 199, 209, 156/212, 219, 244.18, 244.11, 244.22; 264/46.2, 264/46.3

See application file for complete search history.

(56) References Cited

U.S. PATENT DOCUMENTS 2,863,503 A * 12/1958 Stroup .......................... 160/201
3,560,285 A * 2/1971 Schroter .......................... 156/79
3,738,895 A * 6/1973 Paymal .......................... 156/443
3,740,916 A * 6/1973 Kenaga ...................... 52/801.11
3,834,967 A * 9/1974 Lowery .......................... 156/356
3,891,021 A * 6/1975 Geoffrey ....................... 160/235
4,037,006 A * 7/1977 Roberts et al. .................. 428/71
4,147,582 A * 4/1979 Brollo ........................... 156/462
4,238,544 A * 12/1980 Mullet ............................ 428/71
4,339,487 A 7/1982 Mullet ............................ 428/71
4,347,653 A * 9/1982 Martin et al. .............. 29/525.01
4,546,899 A 10/1985 Williams ...................... 220/444
4,581,186 A * 4/1986 Larson ......................... 264/45.8
4,593,449 A 6/1986 Meray-Hovarth et al. ... 29/527.1

(Continued)

FOREIGN PATENT DOCUMENTS

EP 1 722 065 A1 11/2006

(Continued)

OTHER PUBLICATIONS

Office Action mailed Dec. 29, 2008 in corresponding U.S. Appl. No. 11/600,378.

(Continued)

*Primary Examiner* — David Purol
(74) *Attorney, Agent, or Firm* — Renner Kenner Greive Bobak Taylor & Weber

(57) ABSTRACT

A movable door panel having a front facer with opposed longitudinal edge profiles, rails secured to the longitudinal edge profiles, a rear facer secured to the rails, and foam disposed within an inner volume defined by the front facer, the rails and the rear facer is disclosed. Transverse stiffeners are disposed within the inner volume and the foam, and extend between the opposed rails. The door panel may be made by continuously providing the front facer with a rail secured thereto, continuously positioning transverse stiffeners on the front facer and extending between the metal rails, and continuously applying a foaming material on the front facer and the transverse stiffeners. The method concludes by bringing a rear facer into contact with the metal rails, and drawing the panel through a laminator. Hardware may then be attached to one or both of the facers and the stiffener.

7 Claims, 13 Drawing Sheets

U.S. PATENT DOCUMENTS

| | | | | |
|---|---|---|---|---|
| 4,746,383 | A * | 5/1988 | Bacon et al. | 156/79 |
| 5,125,155 | A * | 6/1992 | Kyle et al. | 29/897.32 |
| 5,273,693 | A | 12/1993 | Rothwell et al. | 264/33 |
| 5,373,678 | A * | 12/1994 | Hesser | 52/592.1 |
| 5,435,108 | A | 7/1995 | Overhold et al. | 52/309.11 |
| 5,445,208 | A * | 8/1995 | Shaner et al. | 160/232 |
| 5,557,899 | A | 9/1996 | Dube et al. | 52/455 |
| 5,693,271 | A | 12/1997 | Johnson et al. | 264/45.7 |
| 5,827,458 | A * | 10/1998 | Meadows | 264/46.2 |
| 5,836,499 | A | 11/1998 | Mullet et al. | 226/168 |
| 6,134,857 | A | 10/2000 | Hope | 52/656.7 |
| 6,467,143 | B1 * | 10/2002 | Kim | 29/33 R |
| 6,554,048 | B1 * | 4/2003 | Jella | 160/229.1 |
| 6,584,740 | B2 | 7/2003 | Record | 52/270 |
| 6,635,218 | B2 | 10/2003 | King | 264/536 |
| 6,679,310 | B2 | 1/2004 | De Zen | 160/229.1 |
| 6,915,573 | B2 * | 7/2005 | Mullet | 29/897.32 |
| 7,059,380 | B2 | 6/2006 | Bennett, III et al. | 160/229.1 |
| 7,127,856 | B2 | 10/2006 | Hagen, Jr. et al. | 52/309.9 |

FOREIGN PATENT DOCUMENTS

WO WO 2005/011950 A2 2/2005

OTHER PUBLICATIONS

Response to Office Action mailed Dec. 29, 2008 as electronically filed Apr. 29, 2009 in corresponding U.S. Appl. No. 11/600,378.

Office Action mailed Aug. 19, 2009 in corresponding U.S. Appl. No. 11/600,378.

* cited by examiner

MOVABLE BARRIERS HAVING TRANSVERSE STIFFENERS AND METHODS OF MAKING THE SAME

TECHNICAL FIELD

The present invention relates generally to movable barriers having transverse stiffeners. More specifically, one or more embodiments of the present invention relate to upwardly acting sectional doors having improved resistance to bowing both during and after production due to transverse stiffeners within the door. More particularly, the present invention relates to sectional door panels having stiffeners extending laterally therein to prevent bowing of the door panel without affecting the exterior appearance of the panel.

BACKGROUND ART

Movable barriers, such as garage doors and the like, generally include a multi-panel door supported by a track system, upon which the door is movable between an open, horizontal position and a closed, vertical position. The door panels are pivotally secured to each other via hinges and movably secured to the track system via rollers.

Consumers have steadily indicated a desire for lighter weight, thermally efficient door panels, to reduce energy costs and noise while improving safety. Such door panels may be constructed using a front facer and a rear facer that define a volume therebetween. That volume may be filled with a foamed polymer material or the like. The foam adds structural integrity, adheres the panel components together, and improves the door's insulating properties. Such designs are lighter and in some cases less expensive than traditional solid wood or metal doors.

In some cases these foam filled panels are constructed using both a non-metal front facer and a non-metal rear facer. Such panels may be made in a continuous production process wherein a front facer having opposed longitudinal edges is continuously provided, a metal rail is continuously secured to each longitudinal edge, a foaming material is continuously applied on the front facer between the rails, a rear facer is continuously brought into contact with the rails, and the front facer, metal rails, rear facer and foaming material are drawn through a laminator which includes a plurality of rollers. This continuous production process is an improvement in many respects over the prior method, known as a batch process, in which one panel was formed at a time in a mould. The continuous production method is more efficient, less time consuming, and less expensive.

The production of laminated sectional door panels is complex, however, and results in various stresses in the final product as a result of the lamination processing heat, pressure and tension. As a result of these stresses, sectional door panels can become deformed or "bowed" during or after processing. The tendency to deform either during or after processing is highest when the door panel has one or both of its facers made of plastic. Elevated temperatures and pressures of the insulating foam at the time of lamination can cause the resulting sectional door panel to be unstable at ambient conditions. When the insulating foam cools it can shrink at a higher rate than the outer skins of the panel, causing the panel to deform. In addition, normal environmental thermal cycles in some climates can cause insulated sectional door panels to deform long after they have been produced.

Some sectional door panels are produced from blocks of cut foam rather than by a lamination process. These non-laminated insulated door panels do not experience the same processing conditions as laminated door panels, and therefore are not predisposed to deformation like the laminated panels. Nonetheless, these non-laminated door panels often are equipped with vertical reinforcements, known as stiles, which are used for hinge attachment but also serve to reinforce the panel. Although the stiles help to reinforce the door panels, they also significantly affect the appearance of the door panel because they are exposed to the inside of the door.

Thus, there exists a need in the art for a laminated door panel produced by a continuous lamination process having integral reinforcement to prevent deformation, without altering the appearance of the door panel.

SUMMARY OF THE INVENTION

In light of the foregoing, it is a first aspect of the present invention to provide a movable barrier having transverse stiffeners.

It is another aspect of the present invention to provide a panel comprising a front facer having opposed longitudinal edge profiles, rails secured to the longitudinal edge profiles, a rear facer secured to the rails, wherein the front and rear facers and the rails form an inner volume, foam disposed within the inner volume, and at least one stiffener disposed within the inner volume and the foam, the stiffener extending substantially transversely between the opposed rails.

It is still another aspect of the present invention to provide a method of forming a panel comprising continuously providing a front facer having opposed longitudinal edges, the edges each having a rail, continuously positioning stiffeners on the front facer, extending between the rails, continuously applying a foaming material on the front facer and the transverse stiffeners, continuously bringing a rear facer into contact with the rails, and drawing the front facer, the rails, the stiffeners, the foam, and the rear facer through a laminator having a plurality of rollers.

It is yet another aspect of the present invention to provide a door system comprising a frame defining an opening in a building structure and having roller tracks mounted thereto, a door formed of a plurality of panels hinged to one another and movable between a closed position and an open position on the roller tracks, each panel comprising a front facer having opposed longitudinal edge profiles, rails secured to the longitudinal edge profiles, a rear facer secured to the rails, foam disposed within the inner volume, wherein the front and rear facers and the rails form an inner volume, and at least one stiffener disposed within the inner volume and the foam, the stiffener extending substantially transversely between the opposed rails, a counterbalance system mounted to the frame and operatively connected to the door, and roller assemblies mounted to the panels having rollers engaging the roller tracks.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

As noted in the Summary, the present invention is directed to a panel with a transverse stiffener and methods for the manufacture thereof. The description will proceed with a general discussion of a door system in which the panel is used and the method of manufacturing the panel. Then the description will proceed with specific details regarding the stiffener and its advantageous features.

Figure 1:
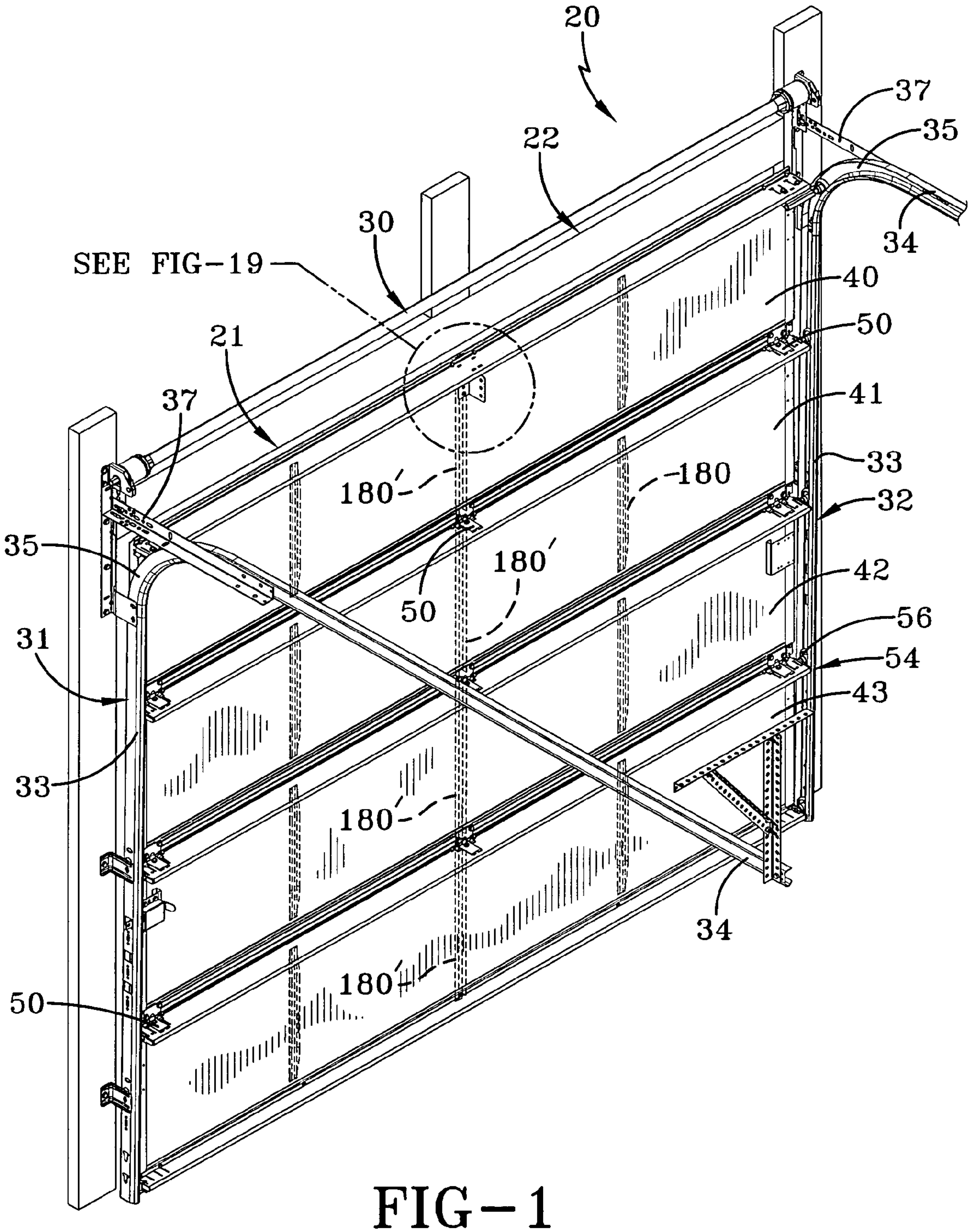
FIG. 1 is rear perspective view of an upwardly acting sectional door.

A movable barrier in the form of an upwardly acting sectional door system according to the concepts of the present invention is generally indicated by the numeral 20 in FIG. 1 of the drawings. The door system 20 is shown mounted in conjunction with a sectional overhead door, generally indicated by the numeral 21, of a type employed in garages for homes. It will be appreciated, however, that the door system 20 can readily be adapted for use in a wide variety of residential and commercial movable barrier applications.

The opening in which the door 21 is positioned for opening and closing movement in conventional fashion is defined by a frame, generally indicated by the numeral 22. Frame 22 is normally constructed of lumber, in a manner well known to persons skilled in the art, for purposes of reinforcement, attachment to the building structure, and to facilitate the attachments of elements involved in supporting and controlling sectional door 21.

As shown in FIG. 1, a counterbalance system, generally indicated by the numeral 30, is secured to the frame 22 and interacts with the door 21 to facilitate raising and lowering the door 21. A counterbalance system according to U.S. Pat. No. 5,419,010 or any of a variety of different types of counterbalancing systems may be employed. A roller track system, generally indicated by the numerals 31 and 32, each including a vertical track section 33, a horizontal track section 34 and a transition track section 35 interposed therebetween is also secured to the frame or otherwise supported by the surrounding structure. The roller tracks 31, 32 support and direct travel of sectional door 21 in moving from the closed, vertical position depicted in FIG. 1 associated with the vertical track sections 33, 33 to the open horizontal position associated with horizontal track sections 34, 34.

While a four panel sectional door 21 is depicted in the drawings, it is to be appreciated that more or less panels may be employed in sectional doors of this type, depending upon the height of the door opening and related considerations. As depicted, the sectional door 21 consists of a top panel 40, an upper middle panel 41, a lower middle panel 42 and a bottom panel 43. Adjacent panels 40-43 are interconnected at their longitudinal edges by hinge assemblies, generally indicated by the numeral 50. Door panel 41 interrelates with the roller tracks 31, 32 by virtue of roller assemblies, generally indicated by the numeral 54. The roller assemblies 54 include rollers 56 which are adapted to engage tracks 31 and 32 in a conventional fashion. The door panels of the present invention will be discussed hereinafter in greater detail by reference to the method of their manufacture, with it being understood that panels 40-43 are identical in most all respects but for their position in sectional door 21.

The continuous production method used to produce the door panels of the present invention may be described generally as having a number of distinct steps or stations. However, the specific aspects of the present invention are directed to the inclusion of a transverse stiffener and how its structural features enhance the overall manufacturing of the door panel and the resulting end product. A first step is a facer forming area where a front facer is formed in a continuous fashion by extruding a sheet of plastic and shaping that sheet into a final form. This front facer is then directed to a rail forming and insertion area where metal rails are continually formed and joined with the front facer. After the metal rails are formed and joined with the front facer, transverse stiffeners are placed onto the facer and between the metal rails. Next, in a laminating area a foaming material is discharged onto the front facer, transverse stiffeners, and rail assembly. Thereafter, according to the present invention, a rear facer is continuously provided to complete the exterior shell of the panel. The assembly is then directed through a laminator to maintain the position of the components, simultaneously allowing the foam to expand and fill the interior volume thereby integrating the transverse stiffeners into the panel. After exiting the laminator, the foam is substantially cured and the panel may be cut to length. In one embodiment, if the panels are used in conjunction with a garage door system, the panels may be provided with appropriate hardware, and assembled with other panels to form the garage door.

Figure 2:
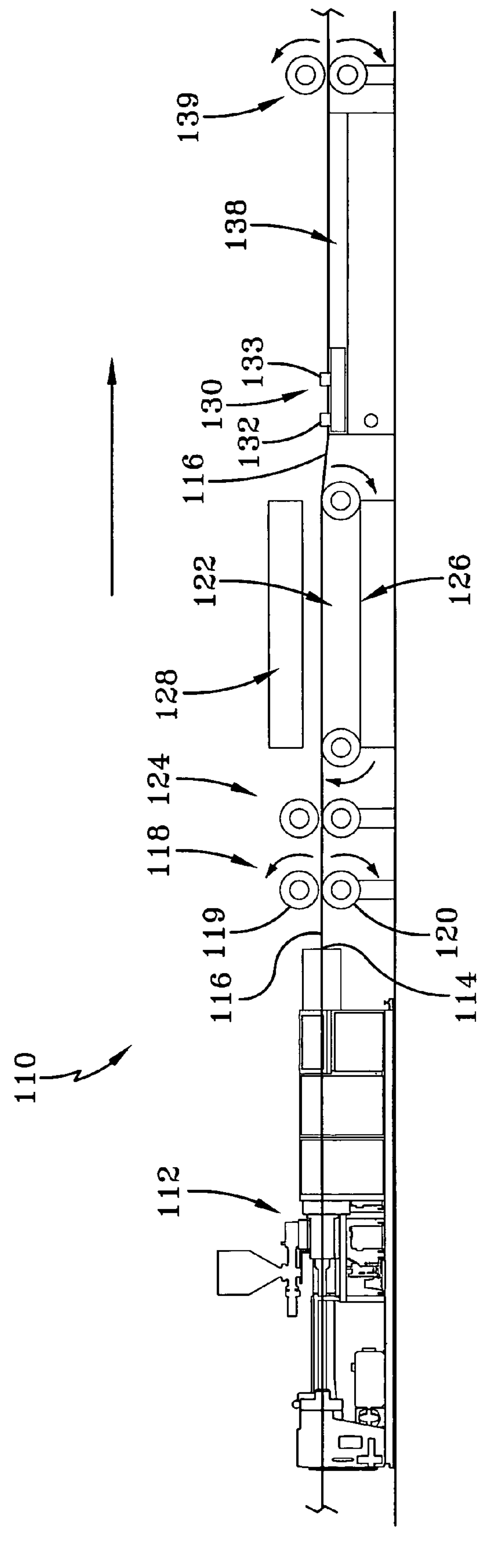
FIG. 2 is a side view of a facer production station.

An exemplary door panel manufacturing method will now be described with reference to the drawings. FIG. 2 shows a facer forming area generally designated by the numeral 110. The forming area will be generally described herein to provide an example of how a front facer is formed and prepared for the next manufacturing station. However, any method of forming a front facer sheet may be employed for the present invention. Facer forming area 110 includes an extruder 112 that produces a continuous sheet of pliable plastic material at a substantially constant rate of speed. As is known in the art, extruder 112 is supplied with plastic stock material, typically in the form of pellets, which are heated and pressed through an extruder die 114. The extruder die 114 of the present embodiment may be described as an elongated straight slot, so that when plastic material is forced therethrough, a continuous flattened front facer 116 is produced. Extruder 112 may include a width control mechanism that is capable of selectively varying the width of front facer 116 to allow for various door panel designs and sizes.

After exiting extruder die 114, the thermoplastic material of the front facer 116 has not yet taken a permanent shape, is still impressionable, and may be directed through an embossing roller assembly 118 to form a desired pattern on the facer. Embossing roller assembly 118 may include at least one upper roller 119 and an opposed, spaced apart lower roller 120. Embossing roller assembly 118 is further provided to propel front facer sheet 116 toward a vacuum former 122 at a predetermined or regulated speed.

Optionally, a temperature compensator 124 may be provided downstream of the embossing roller 118 and prior to vacuum former 122. Temperature compensator 124 may be employed to regulate or adjust the temperature of front facer sheet 116 prior to entry into vacuum former 122.

Front facer sheet 116 may then be drawn through vacuum former 122 to form a variety of raised patterns thereon. When assembled in a door system, front facer 116 of the completed door panel is positioned on the exterior side of the door and thus, decorative patterns or embossments may be desirable. Vacuum former 122 may therefore include a patterned loop or belt 126 that is continually drawn along the top surface of a stationary table with both the belt 126 and the stationary table having holes therein. A cooling system 128 may be associated with vacuum former 122. Vacuum former 122 may also be utilized to begin forming the opposing edges of front facer sheet 116 to facilitate assembly of various other door panel components.

Figure 3:
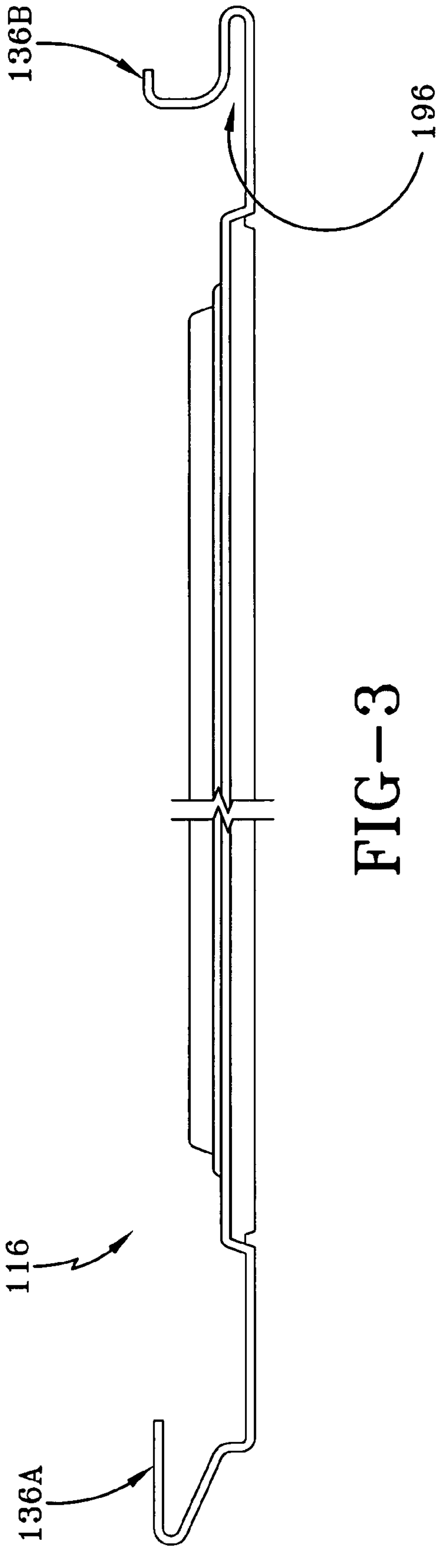
FIG. 3 is an end view of a front facer formed in the facer production station according to the concepts of the present invention having opposing edge profiles.

To complete the formation of edge portions, front facer sheet 116 is next drawn through a post forming area 130. Post forming area 130 may include conventional formers 132 and 133 which provide a plurality of spaced apertures or slots, through which the edge portions of front facer sheet 116 are directed through. Each aperture may include a shape that is sequentially more similar to the final desired end profiles 136A and 136B as seen in FIG. 3. Further, the profile of the left edge portion 136A may be different than the profile of the right edge portion 136B.

Facer sheet 116 is next drawn through a water bath 138 to complete the cooling process and permanently set the shape thereof. Upon exiting water bath 138, facer sheet 116 is no longer impressionable and will thereafter maintain its pattern and end profiles. A puller assembly 139 may be provided to draw facer sheet 116 out of water bath 138.

The completed front facer 116 may now be guided to a rail forming and insertion area 150 (hereinafter rail area 150), shown in FIG. 4. It should be appreciated that prior to entry into rail area 150, a portion of front facer 116 may be allowed to accumulate or hang slack. This accumulation area may be employed to reduce residual tension on front facer 116 and/or allow for minor variations or fluctuations in production speeds between the facer forming area 110 and the rail forming area 150.

Figure 5:
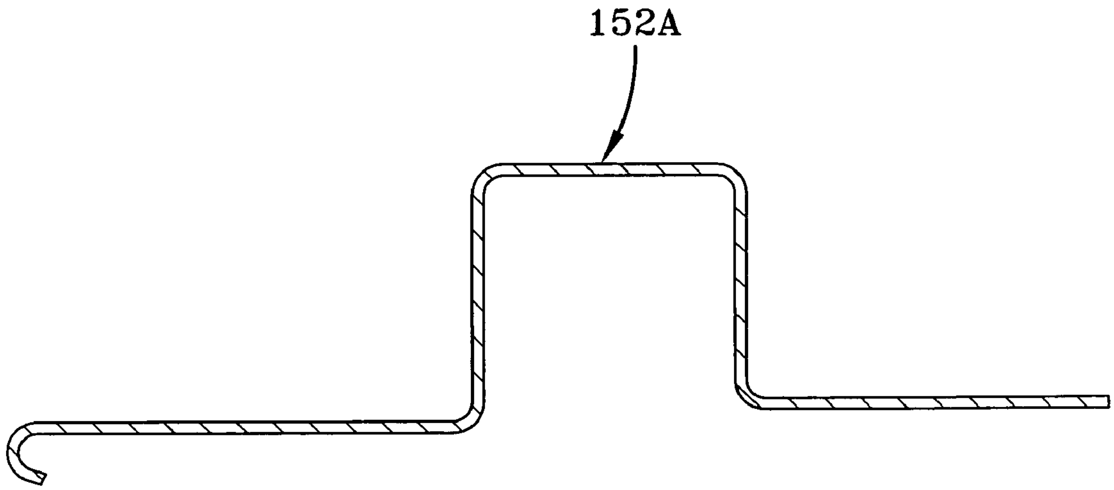
FIG. 5 is an end view of a left metal rail formed in the rail forming area according to the present invention.
Figure 6:
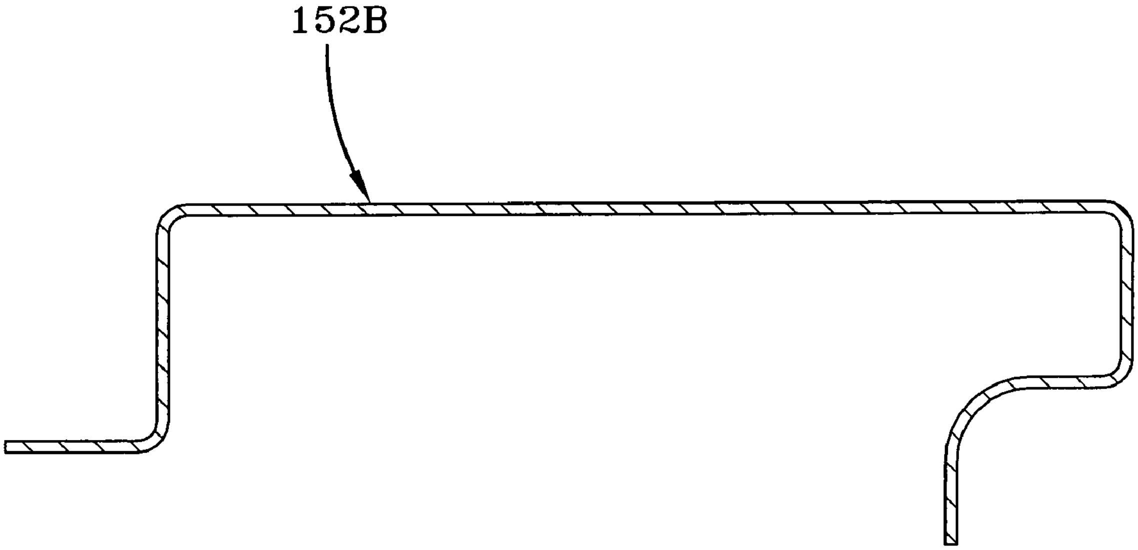
FIG. 6 is an end view of a right metal rail formed in the rail forming area according to the present invention.

In rail forming area 150, a pair of rails 152A and 152B are formed and joined with front facer 116 at edge portions 136A and 136B. Front facer 116 is first drawn through a rail forming apparatus 154 which is adapted to continuously shape metal strips into a desired cross-sectional profile. Rail forming apparatus 154 includes a left side rail former 156A and a right side rail former 156B. Rail formers 156A and 156B are spaced apart to allow front facer 116 to travel uninhibited therebetween. Each rail former 156 is continuously fed from a separate rail stock roll (not shown). The rail stock is of metal composition and is initially in the form of a flattened strip, wound into a roll. The metal stock is fed through respective rail formers 156A and 156B which shape the metal stock as it travels therethrough. Rail formers 156A, 156B output shaped rails 152A, 152B at a speed substantially matching the speed of front facer 116 as it travels through rail area 150. In the present embodiment each rail former 156A and 156B may include a plurality of rotating wheels 158 positioned sequentially to shape the passing metal stock. Each rail former may be driven through a gear arrangement 160 driven by a motor 161. In one embodiment of the invention, rail forming apparatus 154 shapes left rail 152A and right rail 152B to appear as shown in FIGS. 5 and 6. The terms left and right, as used herein, refer to the positions of the various components from a view facing "backward" of the continuously formed door panel, or stated differently, in the opposite direction of the motion of the front facer 116 as it proceeds through the production stations.

After shaping by rail forming apparatus 154, rails 152A and 152B are ready to be joined with front facer 116. Rails 152A and 152B provide structural stability, as well as a sturdy mounting area for brackets, hinges or other hardware. Downstream of rail forming apparatus 154, rails 152A and 152B and front facer 116 are joined by a merging apparatus designated generally by the numeral 164. Merging apparatus 164 generally includes a plurality of guides and rollers that allow rails 152A and 152B to be continuously joined with the edges 136A and 136B of front facer 116. After exiting rail former 156A, left rail 152A is directed through a series of guide blocks 166, 167 and 168, each having a channel corresponding to the shape of left rail 152A. The guide blocks turn and position left rail 152A to the desired position, and the final guide block 168 includes an adhesive applicator which applies adhesive between the left rail 152A and the edge portion 136A. Similarly, right rail 152B is directed through a series of guide blocks 170 and 171 each having a channel corresponding to the shape of right rail 152B. These guide blocks act to turn and position the right rail 152B to the desired position, and include an adhesive applicator to apply adhesive between the right rail 152B and the edge portion 136B. The number of guide blocks for each rail 152 may vary and are not limited to the numbers shown in the Figures.

Figure 4:
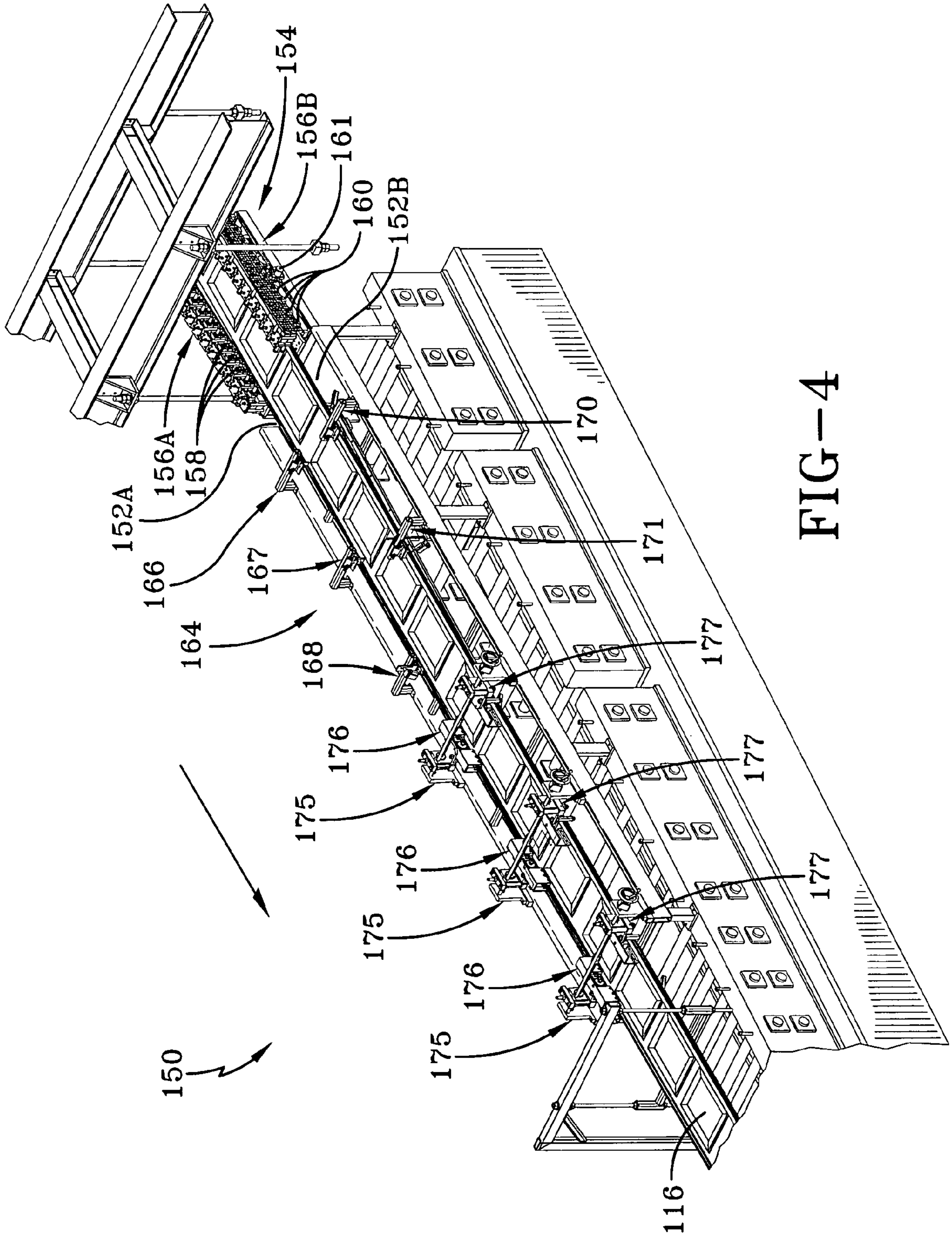
FIG. 4 is an isometric view of a rail forming area according to the present invention.

As shown in FIG. 4, after traveling through and between the plurality of guide blocks, front facer 116 and rails 152A and 152B are thereafter directed through a plurality of pressing assemblies 175. Though the figures show three pressing assemblies, more or less may be used. Pressing assemblies 175 complete the merger of rails 152A and 152B with front facer 116 by both guiding the components and applying a compressive force thereto. Each pressing assembly 175 includes a left side sub-assembly 176 and a right side sub-assembly 177. Left side sub-assembly 176 effectively guides and presses together left rail 152A and left edge portion 136A as they travel therethrough. Likewise, right-side sub-assembly 177 guides and presses together right rail 152B and right edge portion 136B.

Figure 7:
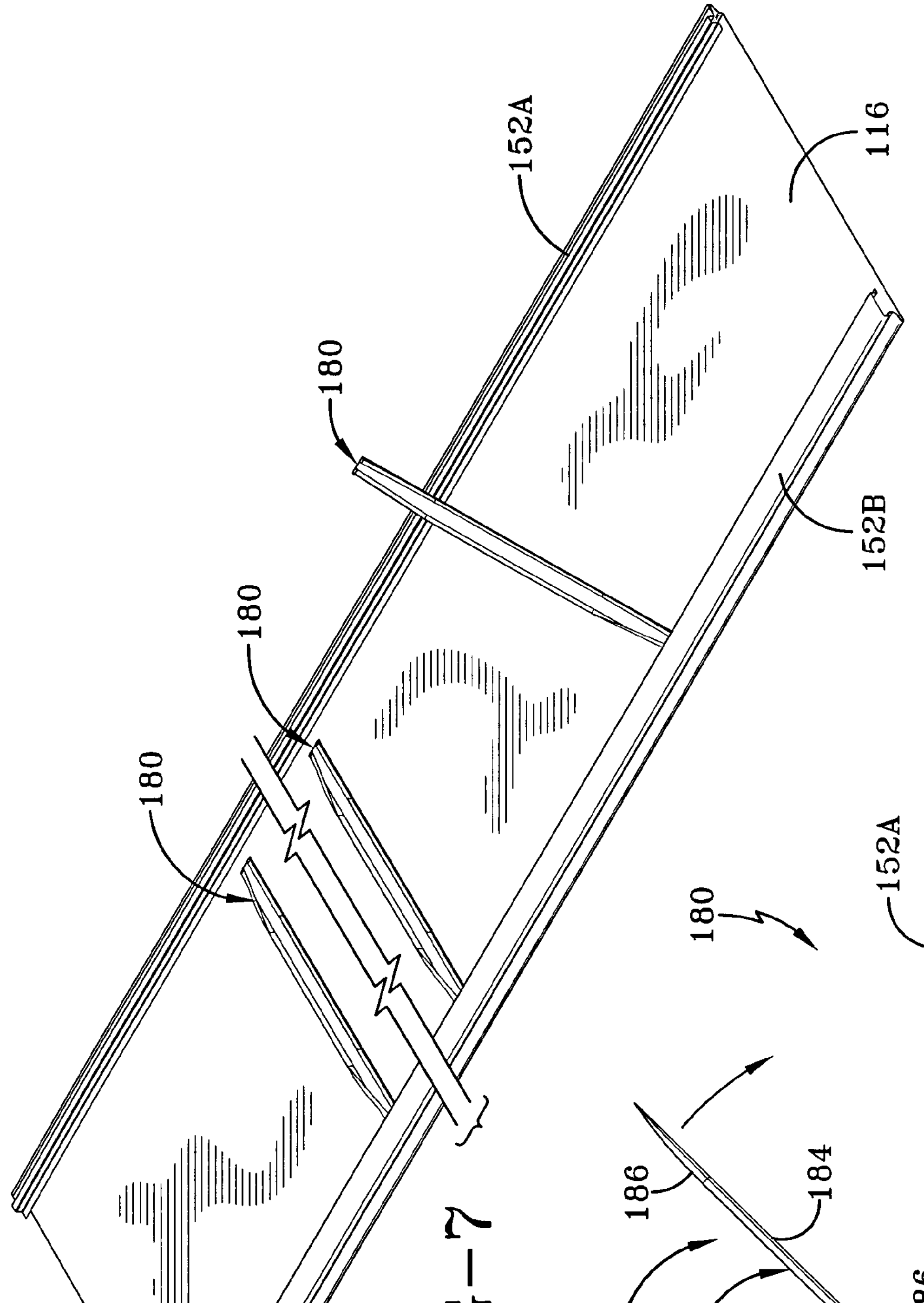
FIG. 7 is an elevated perspective view of a transverse stiffener being inserted onto a facer.
Figure 8:
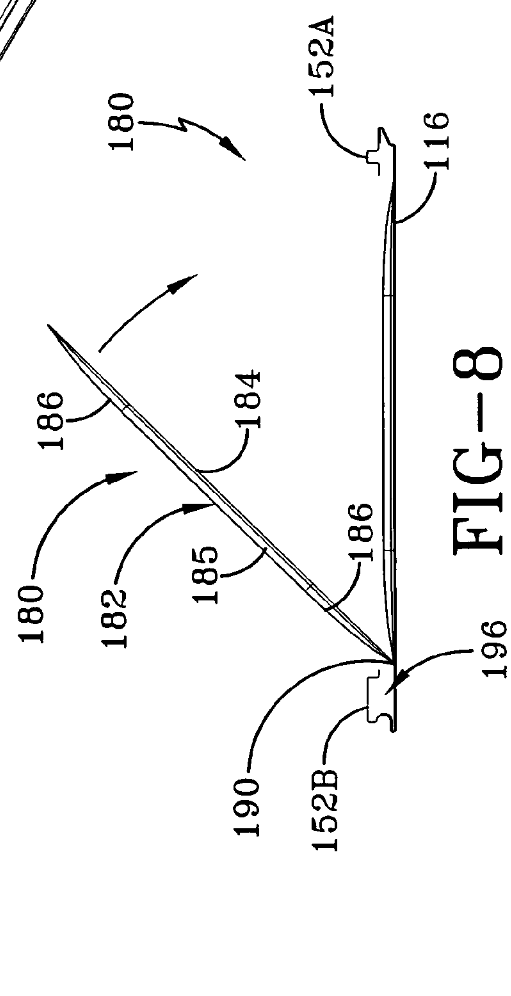
FIG. 8 is a side view of a transverse stiffener being placed onto a facer according to the concepts of the present invention.

After assembly of front facer 116 with rails 152, the assembly is drawn into a transverse stiffener placement area for placement of transverse stiffeners 180 into the assembly, as shown in FIGS. 7 and 8. Transverse stiffeners 180 are positioned on front facer 116 in a direction substantially perpendicular to rails 152A and 152B. Transverse stiffeners 180 may be positioned at various intervals on the front facer 116, depending upon the ultimate length at which the door panel will be cut and other considerations. In many cases the spacing between two consecutive transverse stiffeners will be greater than 24 inches but less than 48 inches. Regardless of the actual distance of the spacing between transverse stiffeners 180, the spacing is ideally uniform throughout the door panels produced in any particular embodiment. In one embodiment of the invention the transverse stiffeners 180 are made of a metal, however they may also be made from other materials, including any material known to those skilled in the art as having high strength characteristics. Materials used to make transverse stiffeners 180 typically have yield strengths greater than 30,000 PSI. Transverse stiffeners 180 may be secured in place by an adhesive as they are positioned on front facer 116 to ensure that they remain in the proper location during subsequent production processes. Conventional adhesives and methods of applying the adhesive may be used and are well known to those skilled in the art, although a hot-melt adhesive is preferable.

Figure 9:
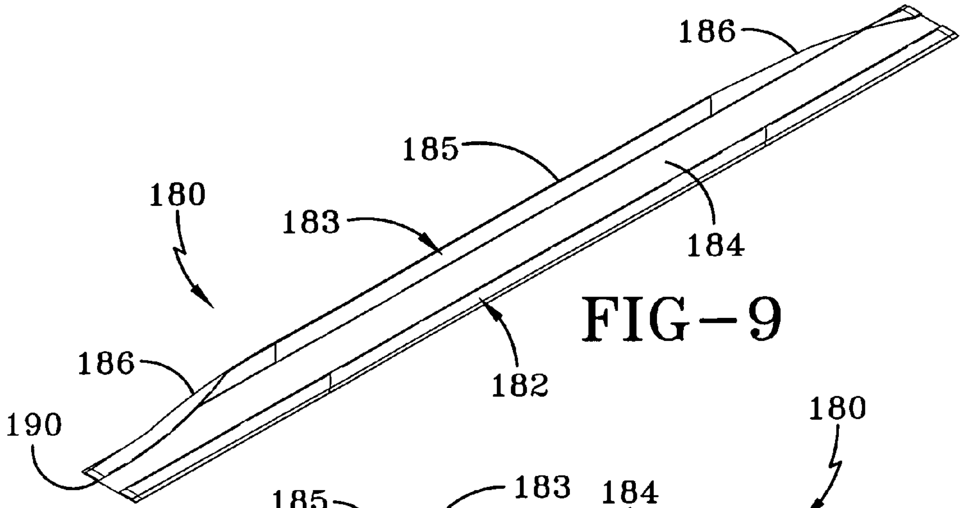
FIG. 9 is a perspective view of a transverse stiffener according to the concepts of the present invention.
Figure 10:
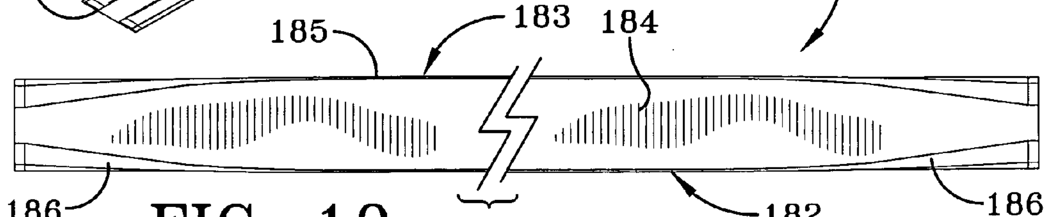
FIG. 10 is a top view of the transverse stiffener according to the concepts of the present invention.
Figure 11:
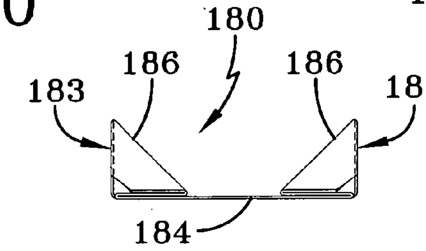
FIG. 11 is an end view of the transverse stiffener.
Figure 12:
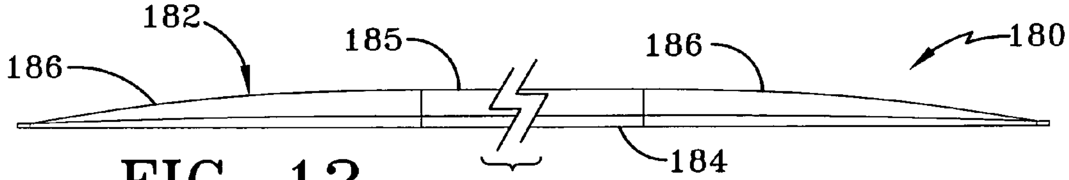
FIG. 12 is a side view of the transverse stiffener.
Figure 17:
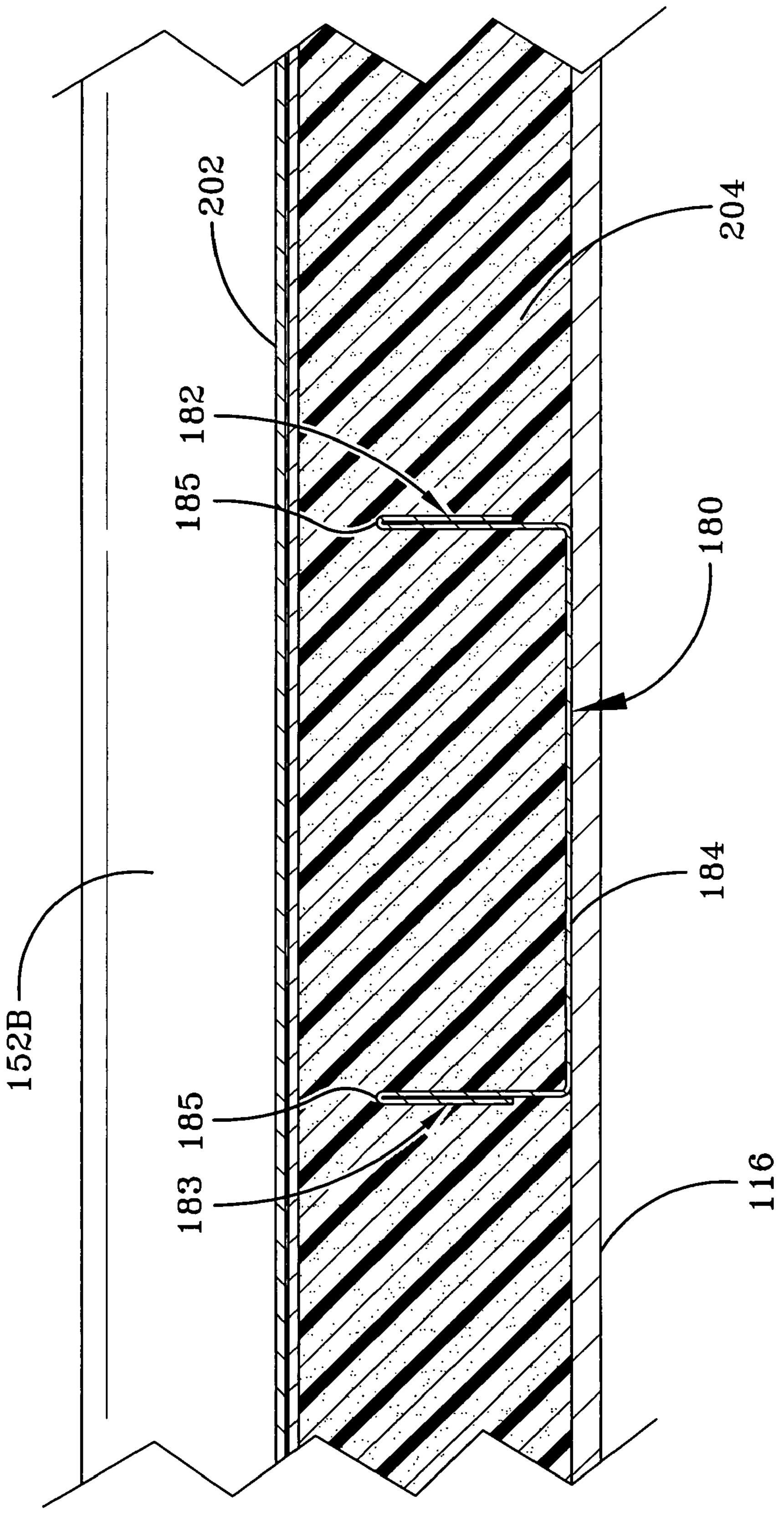
FIG. 17 is a sectional view of a door panel taken across line 17-17 of FIG. 15 showing a transverse stiffener disposed in a door panel according to the concepts of the present invention.

A transverse stiffener 180 of the present invention is shown in FIGS. 8-12, and has a generally "U" shaped cross section. It should be appreciated, however, that transverse stiffener 180 may be of any cross-sectional shape without deviating from the scope of the present invention. Other exemplary cross-sectional profiles include a "C" shaped transverse stiffener or an "L" shaped transverse stiffener. The transverse stiffener shown in FIG. 9 includes opposing side walls 182 and 183 and a bottom portion 184 connecting one edge of side wall 182 to an edge of sidewall 183. Sidewalls 182 and 183 are substantially perpendicular to bottom portion 184 and are substantially parallel to one-another. The side walls may terminate at an edge of any height sufficient to add strength to the door panel, provided the walls are shorter in height than the thickness of the door panel so as to be contained therein. Sidewalls 182,183 may be approximately the height of the foam-filled inner volume of the door panel, as described hereinafter. Side walls 182 and 183 may also advantageously be approximately two-thirds of the height of the foam filled area so as to allow better distribution of expanding foam during lamination. Each side wall includes an outwardly folded mid-portion 185 and inwardly folder taper portion 186 that extends from each end of mid-portion 185 to an end of stiffener 180. The outward and inward folds of the side walls increase the strength of the stiffener and thus, the finished panel. As seen in FIGS. 9 and 17, the outwardly folded mid-portion 185 is folded completely against the side wall. And, as seen in FIGS. 10 and 11, the inwardly folded taper portion 186 is configured at about a 45° angle at each end of the stiffener, and the inward fold-over gradually transitions to where the mid-portion is formed. As will be discussed, the taper portion facilitates the flow of foam material into the end rail area of the panel.

With reference back to FIGS. 7 and 8, transverse stiffener 180 is placed onto front facer 116 by positioning a first end 190 of stiffener proximal a slot 196 in end profile 136B of front facer 116, as shown in FIG. 3. Second end 192 of transverse stiffener 180 is then lowered onto front facer 116 such that bottom portion 184 rests thereon. Adhesive may be applied on to the facer surface and then the stiffener is pressed on the applied adhesive. Alternatively, adhesive may be pre-applied to the underside of bottom portion 184, and then the stiffener is placed on to the facer. Manual or automated mechanisms may be used to ensure proper positioning of the stiffeners with respect to one another.

Figure 13:
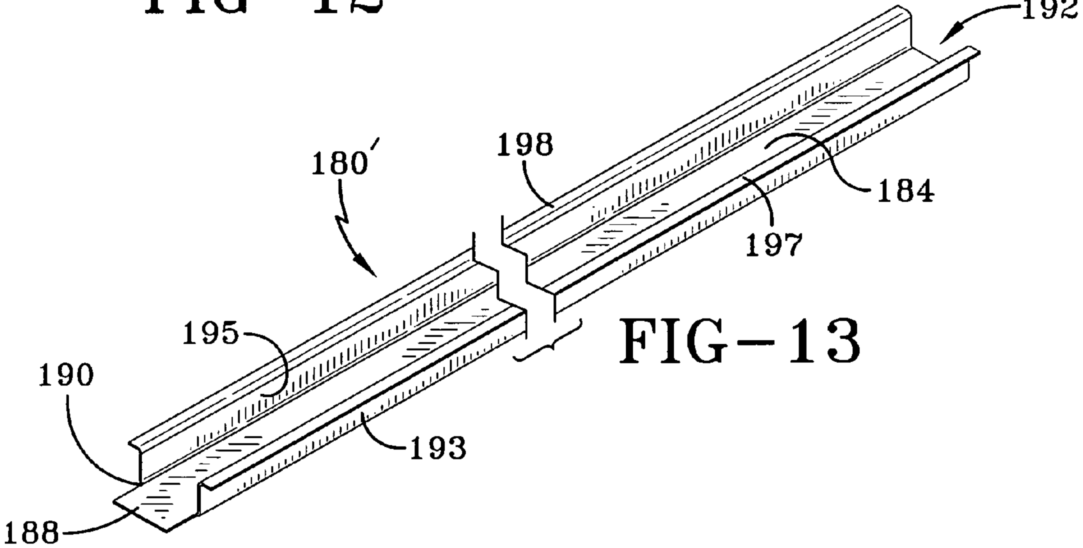
FIG. 13 is a perspective view of a second embodiment of a transverse stiffener according to the concepts of the present invention.

A second embodiment of a transverse stiffener 180' can be seen in FIG. 13. The stiffener 180' is similar to stiffener 180, but includes laterally extending tabs 197 and 198 instead of the inwardly and outwardly folded portions. Stiffener 180' includes opposed side walls 193 and 195 that extend substantially perpendicularly from bottom portion 184. Tabs 197, 198 are integrally formed with and extend substantially perpendicularly from the top edges of sidewalls 193 and 195 opposite bottom portion 184 in a direction extending outwardly. Tabs 197, 198 may perform several functions, including providing additional anchors to maintain transverse stiffener 180' in place within the door panel, as well as providing a convenient mounting location for external hardware attached to the door panel as will be discussed. Also in this embodiment, the bottom portion 184 includes a flange 188 which extends past the ends of sidewalls 193 and 195 at a first end 190 of transverse stiffener 180' (referred to hereinafter as male end 190). A second end 192 of transverse stiffener 180', opposite of male end 190, does not include such a flange. The flange 188 allows for direct placement into the slot 196 to facilitate positioning of the stiffener on to facer 116. If desired, the other embodiment of the stiffener 180 could also be provided with the flange 188. It will be appreciated that all one type of stiffener or a combination of both types of stiffeners could be provided in a single panel.

Figure 14:
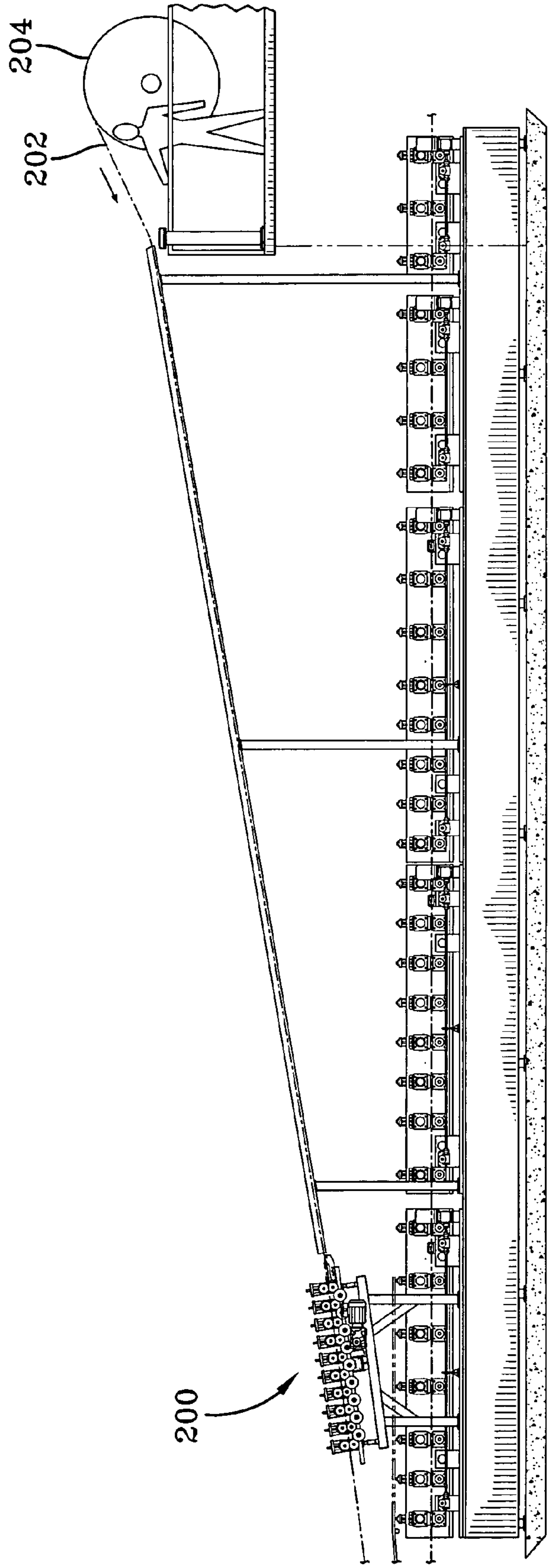
FIG. 14 is a side plan view of the lamination area.
Figure 15:
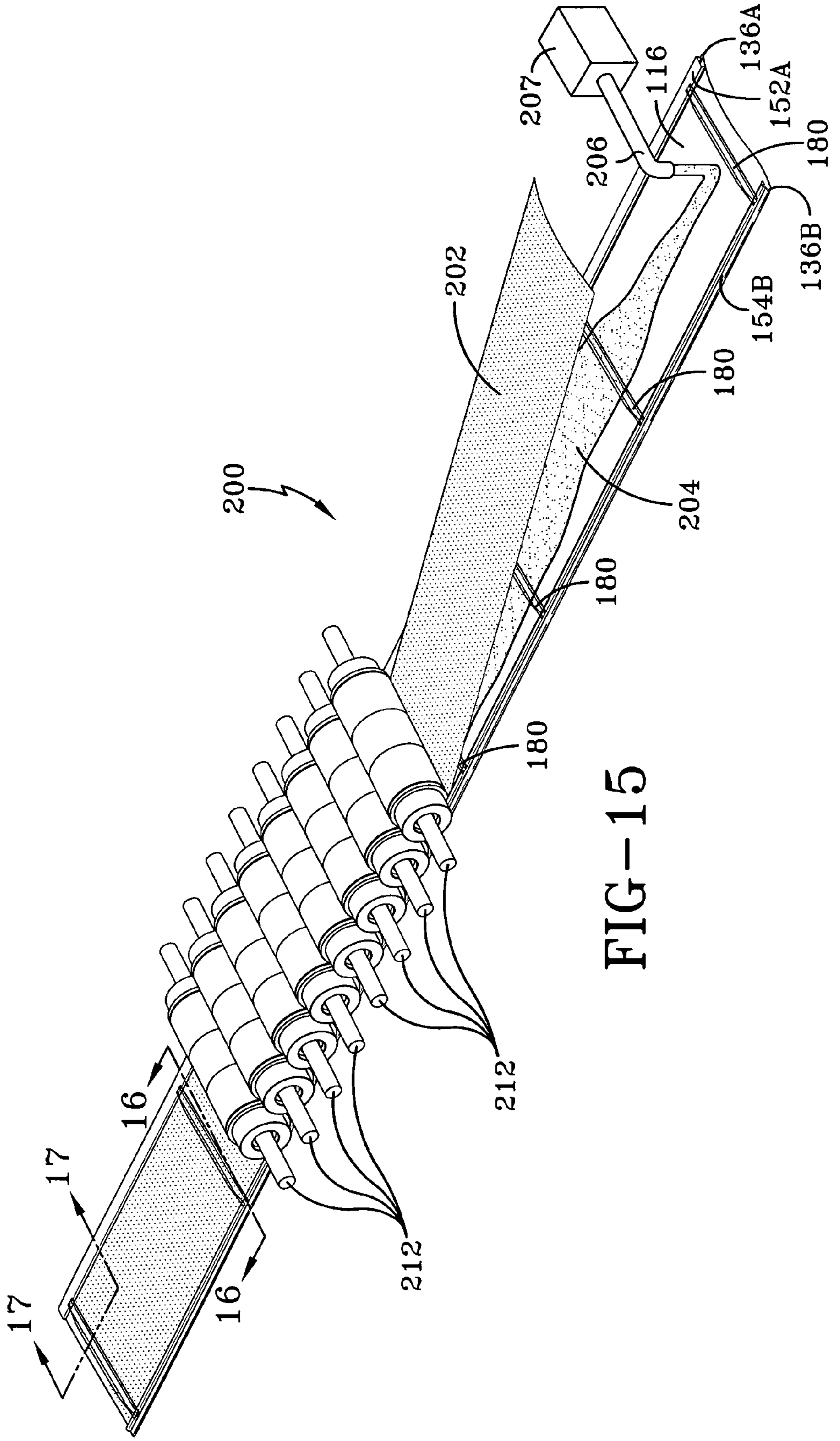
FIG. 15 is a perspective view of the lamination area.

After placement of transverse stiffeners 180 or 180', the door assembly, including front facer 116, rails 152A and 152B, and transverse stiffeners, proceeds toward a lamination area generally indicated by numeral 200 as shown in FIGS. 14 and 15. Prior to lamination, a rear facer 202 is continuously provided from a rear facer stock roll 204 which may be positioned above lamination area 200. Rear facer 202 may be of a plastic composition and may for example be polyvinylchloride, although any plastic may be used. In other embodiments rear facer 202 may be craft paper or the like. Rear facer 202, which has an appropriate thickness, is continuously fed into the laminator to be joined with the other door panel components.

The joining of the various components can be seen with reference to FIG. 15. The assembled front facer 116, transverse stiffeners 180/180', and metal rails 152A and 152B are continuously drawn into laminator 200. Prior to entry into laminator 200, a foam material 204 is provided through a nozzle 206 of a foam unit 207 onto the upwardly facing surface of front facer 116 and onto transverse stiffeners 180. The foam unit and nozzle may be of any conventional design. Foam material 204 may be any substance that expands and thereafter cures into a solid structure. Exemplary foam materials may include polyurethane/isocyanurate mixtures. In one or more embodiments the mix ratio may be about 50/50. In other embodiments, the foam material may be a pentane blown styrene foam. In one or more embodiments the foam density may be about 2.0 to about 2.8 pcf. In the present embodiment a single nozzle is used, though it should be appreciated that a plurality of nozzles may be employed. Just prior to entry into laminator 200, rear facer 202 is brought into contact with metal rails 152A and 152B to create an enclosed volume. In other words, rails 152A and 152B, front facer 116 and rear facer 202 form a closed exterior skin or perimeter, defining the volume therein. An adhesive may be applied between rails 152A, 152B and rear facer 202 by an adhesive applicator (not shown) positioned upstream of laminator 200. Thereafter, the assembled panel is drawn through laminator 200. Inside laminator 200, foam 210 continues to expand and fill the inner volume. Foam 210 surrounds and fills transverse stiffeners 180 as it expands, thereby concealing and integrating them into the door panel and securing them in position.

Laminator 200 may include a plurality of spaced rollers 212. One or more of the rollers 212 may be rotated in unison by a single or a plurality of roller motors (not shown). In the case of a single motor, the plurality of rollers may be interrelated by belts or chains so that rotation occurs in unison. Further, a belt may be provided below rollers 212 so that the assembled door panel is drawn continuously therebetween. Though the present embodiment discloses a roller and belt type laminator, other suitable types of laminators may be employed. For example, a roller chain conveyor using pressure platens may be used. Such laminators are disclosed in U.S. Pat. No. 5,836,499 which is hereby incorporated by reference. The rollers apply pressure to rear facer 202 as foam material 204 cures, while riding along metal rails 152A and 152B. The rollers may be adjustable to accommodate varying sizes of door panels.

Figure 16:
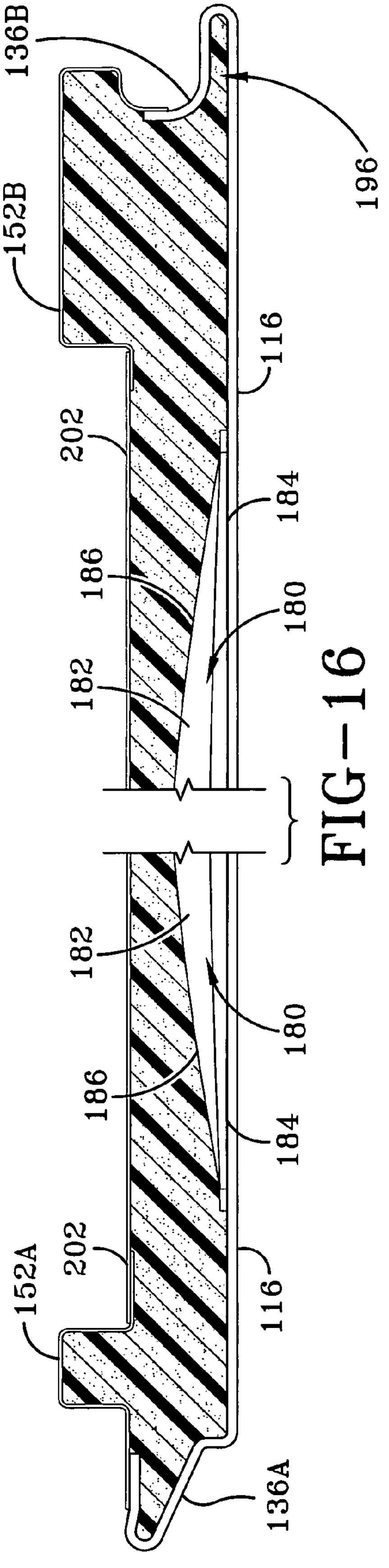
FIG. 16 is a sectional view taken across line 16-16 of FIG. 15 showing the edges of the front facer and metal rails mated together according to the concepts of the present invention.

With reference now to FIG. 16, the cross-sectional profile of the door panel taken along line 16-16 of FIG. 15 can be seen. As is evident, left rail 152A is matingly fitted within left edge portion 136A. As discussed above, adhesive applied between left rail 152A and left edge portion 136A acts to secure the two together. Rear facer 202 rests on top of and in abutting relation to the opposite portion of rail 152A. An adhesive may be applied between left rail 152A and rear facer 202 to attach the two together, as discussed above. Right rail 152B is matingly fitted with right edge portion 136B, and may also be secured thereto by adhesive. Rear facer 202 rests atop the left portion of right rail 152B, and may also be secured by adhesive.

As evidenced by FIG. 16, foam 210 expands within the enclosed volume to fill substantially the entire area between front facer 116 and rear facer 202 and between rails 152A and 152B. As is also apparent, the foam material 204 fills the spaces in and around transverse stiffeners 180, helping to secure them in place. Once cured, foam material 204 provides both structural integrity and contributes to holding the various components together. To promote complete curing of foam material 204, laminator rollers 212 may be positioned within an oven to elevate the temperature of the components. Thus, in this manner, as the assembled components move through laminator 200, foam material 204 expands and hardens. Upon exiting the laminator 200, foam material 204 is substantially cured, and the now rigid continuous length of the panel may be cut to the appropriate length. Individual cut panels may thereafter be equipped with additional hardware components.

With reference to FIG. 17, a cross-sectional view of the door panel is shown taken across line 17-17 of FIG. 15. The “U” shape of transverse stiffener 180 at the mid-portion 185 is evident, with bottom portion 184 located adjacent front facer 116, and with sidewalls 182 and 183 positioned substantially perpendicular to bottom portion 184. Foam material 204 is located between sidewalls 182 and 183 and substantially fills the region therebetween, and also expands so as to abut the outside of sidewalls 182 and 183. In this way transverse stiffeners 180 are integrated into and secured within foam material 204, providing additional strength to the door panel. The inward fold of taper portion 186 also facilitates retention within the foam material.

Figure 18:
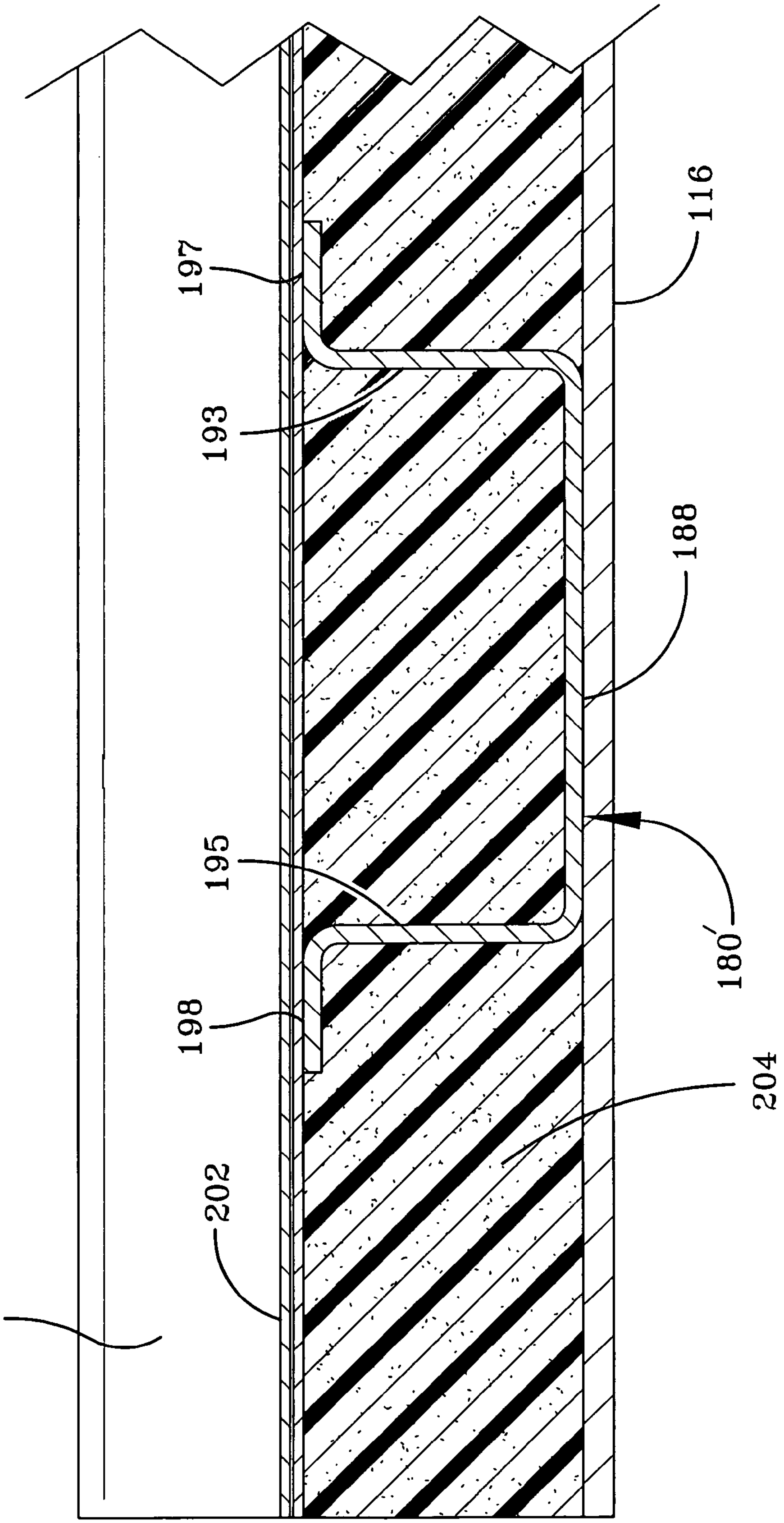
FIG. 18 is a sectional view taken across line 17-17 of FIG. 15 showing the second embodiment of the transverse stiffener as depicted in FIG. 13.

FIG. 18 shows the second embodiment of the transverse stiffener 180' in a cross-section view similar to FIG. 17 with laterally extending tabs 197, 198 visible. As can be seen, the height of side walls 193 and 195 is selected such that tabs 197, 198 are positioned adjacent rear facer 202, thereby providing a surface to which hardware positioned on the interior of door panel 41 can be attached.

Figure 19:
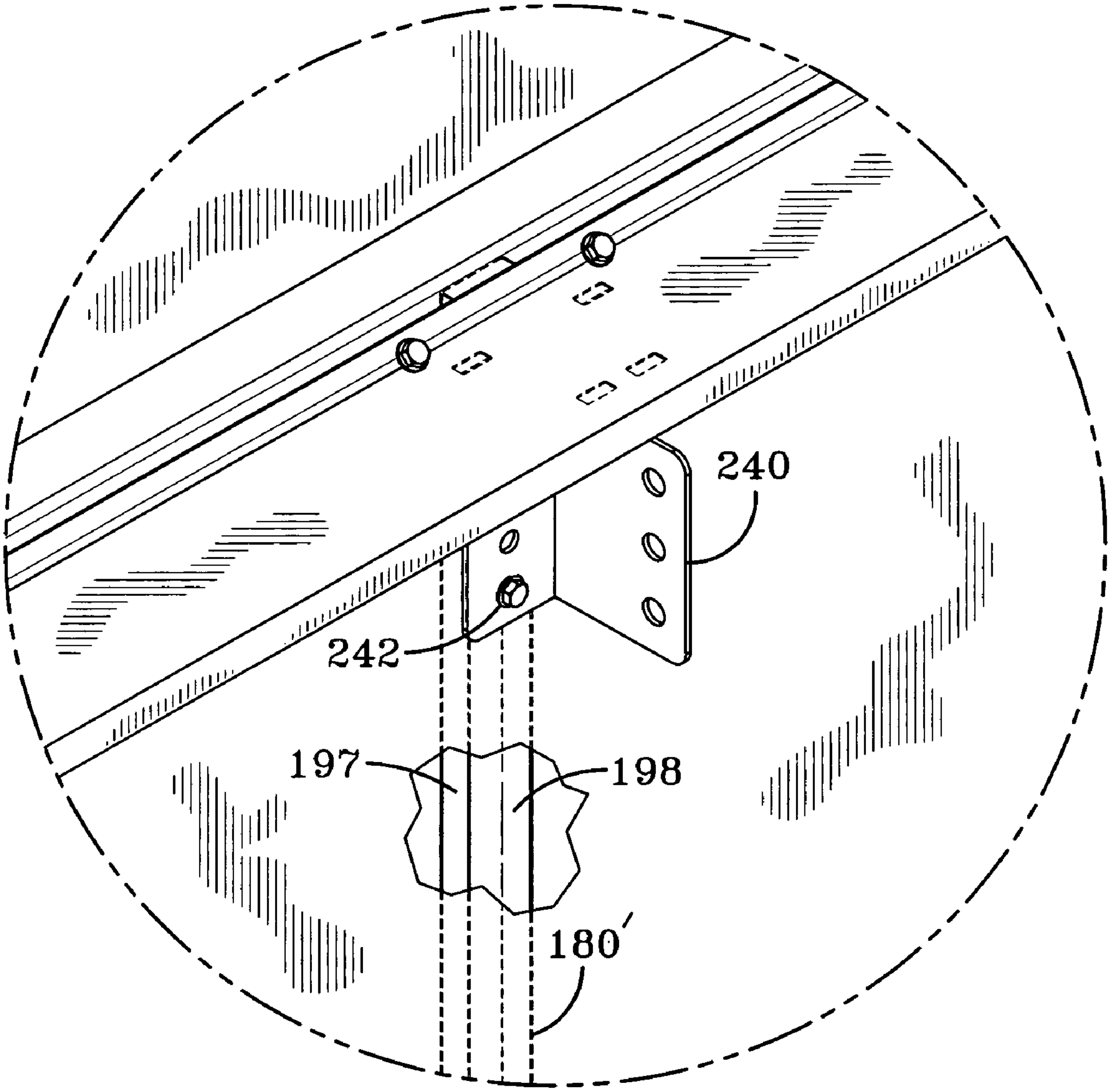
FIG. 19 is a perspective view of the door panel of the present invention having hardware attached to the second embodiment of the transverse stiffener disposed within.

FIG. 19 shows a close-up view of a portion of sectional door 21, as indicated by FIG. 1. Hardware 240 is attached by fasteners 242, 242 to transverse stiffener 180'. Specifically, openings may be pre-drilled through the rear facer and the tabs 197 and/or 198. Next, the fasteners 242 are selected with appropriate threading to allow attachment of the hardware 240 to the transverse stiffener 180'. In its hardened state, the foam material 204 may also contribute to the retention of the fasteners. Hardware 240 may comprise any item that is normally attached to a door panel such as a hinge, strut, roller bracket, handle and the like. Transverse stiffeners 180' provide a superior mounting area due to the high strength provided, as compared with the foam filled door without such a stiffener.

As is readily apparent, there are numerous advantages to the method of inserting transverse stiffeners into a door panel used with a movable barrier and for the door panel itself. Skilled artisans will appreciate that the transverse stiffener disclosed herein is internal to the front and rear facers of a panel. Moreover, the stiffeners are not visible from the inward side of the door and are configured such that the internal foam used to form the panel goes around the transverse stiffener in such a manner so as to integrate it into the finished panel. As a result, external stiles are not required. Moreover, such a configuration contributes to the strength of the panel due to the increased adhesion between the facers and the transverse stiffeners. This is further advantageous in that less galvanizing can be used without concern for oxidation of the stiffeners. In embodiments which use non-metallic facers, use of the transverse stiffeners assist in maintaining their desired planar configuration. In other words, use of the stiffeners as disclosed herein prevents the panels from bowing or otherwise deforming during manufacturing and storage of the panels prior to final manufacturing of a hinged movable barrier. Use of the transverse stiffeners also allows for attachment of hardware in a manner not previously recognized. And all this is done without detracting from the appearance of the final product.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A method of forming a panel comprising:

continuously forming a front facer having opposed longitudinal edges, each of said edges having a rail, and one of said edges including a longitudinally extending slot;

positioning pre-formed stiffeners that include a flange at longitudinally spaced locations on said front facer, said stiffeners extending transversely between said rails, wherein positioning includes receiving said flange in said slot;

continuously applying a foaming material on said front facer and said transverse stiffeners;

continuously bringing a rear facer into contact with said rails; and drawing said front facer, said rails, said stiffeners, said foam, and said rear facer through a laminator having a plurality of rollers.

2. The method according to claim 1, further comprising:

applying an adhesive to said stiffeners to secure them in place on said front facer.

3. The method according to claim 2, wherein said adhesive is a hot-melt adhesive.

4. The method according to claim 1, further comprising:

positioning said stiffeners on said front facer at intervals of greater than approximately 24 inches and less than approximately 48 inches.

5. The method according to claim 1, further comprising:

cutting said door panel to length.

6. The method according to claim 1, further comprising:

securing hardware to said one of said facers and said stiffener.

7. The method according to claim 1, further comprising:

continuously providing an elevated temperature, within said laminator.

* * * * *